(12) United States Patent
Shalen

(10) Patent No.: US 8,788,381 B2
(45) Date of Patent: Jul. 22, 2014

(54) SYSTEM AND METHOD FOR CREATING AND TRADING A DIGITAL DERIVATIVE INVESTMENT INSTRUMENT

(75) Inventor: Catherine T. Shalen, Chicago, IL (US)

(73) Assignee: Chicago Board Options Exchange, Incorporated, Chicago, IL (US)

(*) Notice: Subject to any disclaimer, the term of this patent is extended or adjusted under 35 U.S.C. 154(b) by 650 days.

(21) Appl. No.: 12/575,250

(22) Filed: Oct. 7, 2009

(65) Prior Publication Data

US 2010/0153254 A1    Jun. 17, 2010

Related U.S. Application Data

(60) Provisional application No. 61/103,729, filed on Oct. 8, 2008.

(51) Int. Cl.
    *G06Q 40/00*     (2012.01)
(52) U.S. Cl.
    USPC .......................................................... 705/35
(58) Field of Classification Search
    CPC ........ G06Q 40/00; G06Q 20/22; G06Q 20/29
    USPC ................... 705/1–50; 235/8–152; 238/1–99;
    708/1–80
    See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,903,201 A | 2/1990 | Wagner |
| 4,980,826 A | 12/1990 | Wagner |
| 5,038,284 A | 8/1991 | Kramer |
| 5,101,353 A | 3/1992 | Lupien et al. |
| 5,136,501 A | 8/1992 | Silverman et al. |
| 5,297,031 A | 3/1994 | Gutterman et al. |
| 5,297,032 A | 3/1994 | Trojan et al. |
| 5,305,200 A | 4/1994 | Hartheimer et al. |

(Continued)

FOREIGN PATENT DOCUMENTS

| | | |
|---|---|---|
| EP | 0 752 135 | 2/1999 |
| EP | 0 952 536 A1 | 10/1999 |

(Continued)

OTHER PUBLICATIONS

Ernst Weber, A Short History of Derivative Security Markets, Aug. 2008, Business school university of western australia, web, 1-52.*

(Continued)

*Primary Examiner* — Marissa Liu
(74) *Attorney, Agent, or Firm* — Brinks Gilson & Lione

(57) ABSTRACT

An investment instrument is disclosed that allows investors to take risk positions relative to the occurrence or non-occurrence of a contingent binary event. The contingent binary event will have one of two possible outcomes. In a digital derivatives contract, a long investor agrees to pay a short investor a contract amount in return for the short investor agreeing to pay the long investor one of two different settlement amounts depending on the outcome as the contingent binary event. Typically, one settlement amount will be zero and the other will be an amount greater than the derivatives contract price.

15 Claims, 6 Drawing Sheets

(56) References Cited

U.S. PATENT DOCUMENTS

| | | |
|---|---|---|
| 5,315,634 A | 5/1994 | Tanaka et al. |
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Shepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Katz |
| 6,647,374 B2 | 11/2003 | Kansai |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,246,093 B1* | 7/2007 | Katz ............................ 705/37 |
| 7,255,153 B2* | 8/2007 | Berger et al. ............... 165/80.4 |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1* | 7/2002 | Lange ............................ 705/37 |
| 2002/0103738 A1 | 8/2002 | Griebel |
| 2002/0107784 A1* | 8/2002 | Hancock et al. ............. 705/37 |
| 2002/0128952 A1 | 9/2002 | Melkomian et al. |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139998 A1 | 7/2003 | Gilbert et al. |
| 2003/0167175 A1 | 9/2003 | Salom |
| 2003/0172026 A1 | 9/2003 | Tarrant |
| 2003/0177077 A1 | 9/2003 | Norman |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0117284 A1 | 6/2004 | Speth |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 | 10/2004 | Smith et al. |
| 2004/0236636 A1 | 11/2004 | Lutnick et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |
| 2005/0097027 A1 | 5/2005 | Kavanaugh |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro et al. |
| 2005/0209945 A1 | 9/2005 | Ballow et al. |
| 2005/0216384 A1 | 9/2005 | Partlow et al. |
| 2005/0267833 A1 | 12/2005 | Brodersen |
| 2006/0008016 A1 | 1/2006 | Balakrishnan et al. |
| 2006/0036531 A1 | 2/2006 | Jackson |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0253354 A1 | 11/2006 | O'Callahan |
| 2006/0253355 A1 | 11/2006 | Shalen |
| 2006/0253359 A1 | 11/2006 | O'Callahan et al. |
| 2006/0253367 A1 | 11/2006 | O'Callahan et al. |
| 2006/0253368 A1 | 11/2006 | O'Callahan et al. |
| 2006/0253369 A1 | 11/2006 | O'Callahan |
| 2006/0253370 A1 | 11/2006 | Feuser et al. |
| 2007/0011081 A1 | 1/2007 | Bok et al. |
| 2007/0078740 A1 | 4/2007 | Landle et al. |
| 2007/0106585 A1 | 5/2007 | Miller |
| 2007/0112659 A1 | 5/2007 | Shalen et al. |
| 2007/0162365 A1* | 7/2007 | Weinreb .......................... 705/35 |

(56) References Cited

U.S. PATENT DOCUMENTS

| | | |
|---|---|---|
| 2007/0172352 A1 | 7/2007 | Chiang |
| 2007/0282758 A1 | 12/2007 | Vischer et al. |
| 2008/0059356 A1 | 3/2008 | Brodsky et al. |
| 2008/0065560 A1 | 3/2008 | Bloom |
| 2008/0082436 A1 | 4/2008 | Shalen et al. |
| 2008/0120249 A1 | 5/2008 | Hiatt |
| 2008/0120250 A1 | 5/2008 | Hiatt, Jr. |
| 2008/0154790 A1 | 6/2008 | Hiatt |
| 2008/0183640 A1 | 7/2008 | Shalen |
| 2008/0243676 A1 | 10/2008 | Smith |

FOREIGN PATENT DOCUMENTS

| | | |
|---|---|---|
| WO | WO 00/28449 | 5/2000 |
| WO | WO 00/48053 | 8/2000 |
| WO | WO 00/57307 A1 | 9/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |
| WO | WO 02/37396 A2 | 5/2002 |
| WO | WO 02/077766 A2 | 10/2002 |

OTHER PUBLICATIONS

SEC Notice, Release No. 34-51107, SR-CBOE-2004-75, Federal Register vol. 70, No. 23, dated Friday, Feb. 4, 2005, pp. 6051-6057.
PCX Plus *The Pacific Exchange*, PCX Plus Overview, Oct. 9, 2003, six pages.
The National Association of Securities Dealer, Inc. "NASD Notice to members" 00-65, Sep. 2000, 5 pages.
Special Study: Payment for Order Flow and Internalization in the Options Markets, www.sec.gov/new/studies/ordpay.htm, printed on Oct. 22, 2001, 39 pages.
Domowitz, Ian, "A taxonomy of automated trade execution systems", 12 Journal of Intl'Money and Finance, p. 607-631, dated 1993.
Evans et al. "The Effects of Electronic Trading System on Open-outcry Commodity Exchange", Social Science 410, Nov. 1998.
Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.
Tsang, R. "Open outcry and electronic trading in futures exchanges", Bank of Canada Review, Spring 1999, pp. 21-39.
Elind Computers Private LMTD, "Online Global Trading System for Marketplaces", brochure, 2002.
C. Danis, et al. "Alternatives to an Open Outcry Market: An Issue of Supporting Cooperation in a Competitive Situation", IBM TJ Watson Research Center, USA.
Clemens et al., "Segmentation, differentiation, and flexible pricing: Experiences with information technology and segment-tailored strategies", *Journal of Management Information Systems: JMIS*, vol. 11, No. 2, pp. 9-36, Fall 1994.
"Squeezing the poor", *Guardian*, p. 8, Feb. 11, 1997.
"La libre competencia sacude a las electricas", *Actualidad Economica*, p. 18, Sep. 30, 1996.
Souter, Gavin, "Bermuda's reinsurers eager to please", *Business Insurance*, vol. 28, No. 44, p. 77, Oct. 31, 1994.
"The Electronic Component", The Options Institute Online Learning Center, obtained at the internet address: http://www.cboe.com/LearnCenter/cboeeducation/Course_02_02/mod_02_03.html.
E. Clemons et al., "Information Technology and Screen-Based Securities Trading: Pricing the Stock and Pricing the Trade",*Management Science*, vol. 43, No. 12, Dec. 1997.
"The Pandora's Box over autoquotes; Industry Trend or Event", *Wall Street & Technology*, Section No. 3, vol. 13, p. 38; ISSN: 1060-989X, Mar. 1997.
"How is a Trade Executed—Limit Order", *Nasdaq*, dated Mar. 7, 2000, One Page.
S. Cosgrove, "Courting Retail, Institutional Customers, CBOE, AMEX Get Creative", *Knight-Ridder Financial News*, Jan. 29, 1993.
Self-Regulatory Organizations: Proposed Rule Change by the Cincinnati Stock Exchange Relating to Small Order Execution Guaranty, 1985 WL 547562; SEC Release No. 22330, Aug. 15, 1985.
A Monitoring Report on the Operation of the Cincinnati Stock Exchange National Securities Trading System, U.S. Securities and Exchanges Commission, May 1981.
A Report on the Operation of the Cincinnati Stock Exchange National Securities Trading System 1978-1981, U.S. Securities and Exchange Commission, Sep. 1982.
CBOT Press Release Entitled "Impressive Project Areg. Provides Extended Opportunity in CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.
A. Frino et al., Price and Time-Priority Versus Pro-Rata Algorithms in Electronically Traded Futures Markets: Simulation Based Performance Characteristics, Oct. 3, 1998, http://www.sirca.org.au/research/database.html (Document 1998009.pdf).
A. Frino et al., The Liquidity of Automated Exchanges: New Evidence From Germany Bund Futures, vol. 8, Journal of International Financial Markets, Institutions and Money, pp. 225-241 (1998).
Self-Regulatory Organization; Chicago Stock Exchange, Inc.; Order Approving Proposed Rule Change Creating the Chicago Match System (59 F.R. 63141) SEC Release No. 34-35030, 1994 SEC LEXIS 3863, Nov. 30, 1994.
A. Sarker et al., "Electronic Trading on Futures Exchanges," Current Issues in Economics and Finance, Federal Reserve Bank of New York, vol. 4, No. 1, Jan. 1998.
Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.
CBOE Rules, CCH (1989) (Rules 6.45-8.80).
CBOE Information Circular IC 93-88 (Nov. 18, 1993).
U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).
Self-Regulatory Organizations; Filing and Order Granting Accelerated Approval of Proposed Rule Change by the Chicago Board Options Exchange, Inc., Relating to System Modifications to the Retail Automated Execution System, SEC Release No. 34-32879, vol. 58, No. 182, Sep. 22, 1993, 49342-49343.
CBOE Regulatory Circular RG 91-71, Dec. 25, 1991.
Notice of Receipt of Plan Filed Pursuant to Section 11A(a)(3)(B) of the Securities Exchange Act of 1934, 1980 WL 29398, SEC Release No. 34-16519, Jan. 22, 1980, 7 pages.
New York Stock Exchange Constitution and Rules (Commerce Clearing House, Inc. New York Stock Exchange Guide) Jul. 15, 1965, pp. 2644-2645; 2682-2683.
R. Teweles et al., The Stock Market, Fifth Edition, John Wiley & Sons, 1987, pp. 176-181.
J. Meeker, The Work of the Stock Exchange, The Ronald Press Company 1923, pp. 108-109.
CBOE Information Circular IC91-15, Feb. 25, 1991.
"smartRay.com Delivers Stock Quotes and Financial Information to Wireless Devices for Free !", PR Newswire, p. 2870, Dec. 16, 1999.
Glen, Jack D., "Trading and information systems in two emerging stock markets", East Asian Executive Reports, vol. 16 No. 12, pp. 8, 14, Dec. 15, 1994.
Michaels, Jenna, "NASD's Global Fumble", All Street & Technology, vol. 9 No. 11, pp. 5762, Jul. 1992.
"PHLX Files Rule Changes to Improve Handling Orders on Pace", Securities Week, p. 5, Jul. 17, 1989.
"NYSE Votes to Restrict Computerized Trading", San Jose Mercury News, Feb. 5, 1988.

(56) References Cited

OTHER PUBLICATIONS

SEC Notice, Release No. 34-47959, SR-CBOE-2002-05, Federal Register vol. 68, No. 110, dated Monday, Jun. 9, 2003, pp. 34441-34448.
Original Rule Filing and Amendment No. 1 to SR-CBOE-2002-05, Submitted to SEC on Jan. 16, 2002, 17 pages.
Amendment No. 2 to SR-CBOE-2002-05, Submitted to SEC on May 16, 2002, 21 pages.
Amendment No. 3 to SR-CBOE-2002-05, Submitted to SEC on Jan. 15, 2003, 69 pages.
Amendment No. 4 to SR-CBOE-2002-05, Submitted to SEC on Apr. 3, 2003, 71 pages.
Amendment No. 5 to SR-CBOE-2002-05, Submitted to SEC on May 15, 2003, 3 pages.
Amendment No. 6 to SR-CBOE-2002-05, Submitted to SEC on May 30, 2003, 28 pages.
SEC Notice, Release No. 34-39086, SR-PCX-97-18, Federal Register vol. 62, No. 185, dated Wednesday, Sep. 24, 1997, pp. 50036-50048.
Angel, James J., "How Best to Supply Liquidity to a Small-Capitalization Securities Market", Georgetown University, Jul. 15, 1996, 27 pages.
SEC Notice, Release No. 34-47676, SR-CBOE-2002-05, Federal Register vol. 68 No. 77, dated Tuesday, Apr. 22, 2003, pp. 19865-19874.
Co-Pending U.S. Appl. No. 60/986,727, filed Nov. 9, 2007.
SEC Notice, Release No. 34-46803, SR-PCX-2002-36, Federal Register vol. 67 No. 222, dated Monday, Nov. 18, 2002, pp. 69580-69592.
Raithel, Tom, article titled "Major Changes Seen for Exchanges", *Evansville Courier and Press*, Apr. 12, 2000, p. B.6.
Sulima, Cheryl, "Volatitly and Variance Swaps", *Capital Markets News*, Federal Reserve Bank of Chicago, Mar. 2001.
Hull, J. and White, A., "The Valuation of Credit Default Swap Options", *Journal of Derivatives*, vol. 10, No. 3, 2003, p. 40.
Duffie, D. and Huang, M., "Swap Rates and Credit Quality", Mar. 31, 1995.
Blahnik, Mike, "Internet Opens Up Trading Frontiers", Star Tribune, Metro Edition, Minneapolis, MN, Retrieved from: http://web.archive.org/web/20040322223904/http://www.trade.com/, dated Jul. 25, 2004.
Bogomolny, Laura,: Wanna Make a Bet?, Canadian Business, Toronto, vol. 77, Iss. 21, Oct. 25 to Nov. 7, 2004.
Sodergreen, John, "Product profile: Economic Derivatives in the Energy Sector", *Futures Industry Magazine*, Jan.-Feb. 2005 issue, retrieved from http://www.futuresindustry/org/fi-magazine-home.asp?v=p&q=1018 on May 20, 2008.
Whaley, Robert. "Return and Rick of CBOE Buy Write Monthly Index", *The Journal of Derivatives*, 2002, pp. 35-42.
Chicago Board of Options Exchange, Inc. Description of the CBOE S & P 500 BuyWrite Index (BXM$^{SM}$), 5 pages, 2004.
Morgan Stanley, "Global Medium-Term Notes, series F", *Registration statement* No. 333-117752, Securities Commission and Exchange, 2004, pp. 22-26.
Chicago Board of Options Exchange, Inc. The New CBOE Volatility Index, 19 pages, 2003.
Vasiliki D. Skintzi, "Implied correlation index: A new measure of diversification", The Journal of Future Markets, Feb. 2005, vol. 25, Iss. 2, pp. 1-3.
U.S. Appl. No. 11/849,835, filed Sep. 4, 2007, entitled "System and Method for Creating and Trading a Derivative Investment Instrument Over a Range of Index Values", Applicant: O'Connell et al.
U.S. Appl. No. 12/112,605, filed Apr. 30, 2008, entitled "System and Method for Creating and Trading a Derivative Investment Instrument Over a Range of Index Values", Applicant: O'Connell et al.
U.S. Appl. No. 12/267,013, filed Nov. 7, 2008, entitled "Method and System for Creating a Volatility Benchmark Index", Applicant: Catherine T. Shalen.
Transitions 103, *Transitions Trading* website, retrieved using: www.archive.org Jul. 29, 2004 and Dec. 11, 2004.
Devore, Jay L., "Probability and Statistics for Engineering and the Sciences, Second Edition", Published 1987 by Wadsworth, Inc. pp. 13-16 and 88-96.
Demeterfi, Kresimir, et al., "More Than You Ever Wanted to Know About Volatility Swaps," Goldman Sachs Quantitative Strategies Research Notes, Mar. 1999.
CBOE Futures Exchange letter dated May 17, 2004, to Commodity Futures Trading Commission with accompanying pages containing rules, terms, and conditions for a new product to be traded on the CBOE Futures Exchange, 8 pages.
Press Release article, "CBOE Announces Launch of Futures on VIX: First Tradable Volatility Product Will be Offered on New CBOE Futures Exchange," Sep. 5, 2003, two pages.
Internet opens up trading frontiers, [Metro Edition] Mike Blahnik, Staff Writer, *Star Tribune*, Minneapolis, MN, Jul. 25, 2004.
Wanna make a bet?, Laura Bogomolny, *Canadian Business*, Toronto, Oct. 25-Nov. 7, 2004, vol. 77, Issue 21.
Bounds for a Volume Weighted Average Price Option, A.W. Stace, Sep. 24, 2004.

\* cited by examiner

SYSTEM AND METHOD FOR CREATING AND TRADING A DIGITAL DERIVATIVE INVESTMENT INSTRUMENT

CROSS REFERENCE TO RELATED APPLICATIONS

This application claims the benefit of pending U.S. Provisional Application No. 61/103,729, filed Oct. 8, 2008, the entirety of which is incorporated herein by reference.

TECHNICAL FIELD

The present disclosure relates to methods of creating and trading derivative contracts whose value depends on the occurrence or non-occurrence of specified events.

BACKGROUND

Traditional derivatives contracts, such as futures and options contracts, are well known investment instruments. In a futures contract, for example, a buyer purchases the right to receive delivery of an underlying commodity or asset on a specified date in the future. Conversely, a seller agrees to deliver the commodity or asset to an agreed location on the specified date. Futures contracts originally developed in the trade of agricultural commodities. Large consumers of agricultural products seeking to secure their future supply of raw ingredients like corn, wheat and other commodities would pay in advance for guaranteed delivery in the future. Producers in turn would sell in advance to raise capital to finance the cost of production. The success of agricultural futures soon led to futures activity surrounding other commodities as well. Today futures contracts are traded on everything from pork bellies to memory chips, and from stock shares to market indices.

Over the years futures contracts have evolved from simply a means of securing future delivery of a commodity into sophisticated investment instruments. Because futures contracts establish a price for the underlying commodity in advance of the date on which the commodity must be delivered, subsequent changes in the price of the underlying asset will inure to the benefit of one party and to the detriment of the other. If the price rises above the futures price, the seller is obligated to deliver the commodity at the lower agreed upon price. The buyer may then resell the received product at the higher market price to realize a profit. The seller in effect loses the difference between the futures contract price and the market price on the date the goods are delivered. Conversely if the price of the underlying commodity falls below the futures price, the seller can obtain the commodity at the lower market price for delivery to the buyer while retaining the higher futures price. In this case the seller realizes a profit in the amount of the difference between the current market price on the delivery date and the futures contract price. The buyer sees an equivalent loss.

As the preceding discussion makes clear, futures contracts lend themselves to speculating in price movements of the underlying commodity. Investors may be interested in taking a "long" position in a commodity, buying today at the present futures price for delivery in the future, in anticipation that prices for the commodity will rise prior to the delivery date. Conversely investors may wish to take a short position, agreeing to deliver the commodity on the delivery date at a price established today, in anticipation of falling prices.

As futures contracts have evolved away from merely a mechanism for securing future delivery of a commodity into sophisticated investment instruments, they have become more and more abstracted from the underlying assets on which they are based. Whereas futures contracts originally required actual delivery of the underlying commodity on the specified delivery date, today's futures contracts do not necessarily require assets to change hands. Instead, futures contracts may be settled in cash. Rather than delivering the underlying asset, cash settlement requires that the difference between the market price on the delivery date and the contract price be paid by one investor to the other, depending on which direction the market price has moved. If the prevailing market price is higher than the contract price, the investor who has taken a short position in the futures contract must pay the difference between the market price on the delivery date and the contract price to the long investor. Conversely, if the market price has fallen, the long investor must pay the difference between the contract price and the market price to the short investor in order to settle the contract.

Cash settlement allows further abstraction of futures contracts away from physical commodities or discrete units of an asset such as stock shares. Today futures contracts are traded on such abstract concepts as market indices and interest rates. Futures contracts on market indices are a prime example of the level of abstraction futures contracts have attained. Delivery of the underlying asset is impossible for a futures contract based on a market index such as the S&P 500. No such asset exists. However, cash settlement allows futures contracts to be written which allow investors to take positions relative to future movements in the value of an index, or other variable market indicators. A futures price is established based on a target value of the index on a specified "delivery" date. The difference between the target value price and the actual value of the index (often multiplied by a specified multiplier) is exchanged between the long and short investors in order to settle the contract. Traditionally, cash settlement occurs on the last day of trading for a particular contract. Thus, if the actual value of the index rises above the target value, the short investor must pay to the long investor an amount equal to the difference between the actual value and the target value times the specified multiplier. Conversely if the actual index value falls below the target value, the long investor must pay to the short investor the difference between the actual value and the target value multiplied by the multiplier.

The value of traditional futures contracts is inherently tied to the market price or value of the underlying asset and the agreed upon settlement price. The market value of the underlying asset itself, however, may be influenced by any number of external factors. For example, the amount of rainfall in Iowa in June could affect the value of corn futures for September delivery. The latest national productivity report may have a positive or negative impact on S&P 500 futures. If the share price of a particular company reaches a certain value, it may impact the price investors are willing to pay for futures based on that company's shares. The factors that influence the value of traditional futures contracts may also have an impact on other investments and assets. For example, if the share price of a market leader in a certain economic sector were to reach a certain value, it may signal to investors that the whole sector is poised for significant growth and may pull up the share price of other companies in the same sector. Likewise, an unexpected change in interest rates by the Federal Reserve may affect share prices broadly throughout the capital markets.

When investors wish to take positions based on the occurrence or non-occurrence of various contingent events that may have broad impact across any number of individual investments, they may take a number of positions in various investments that the investor believes will all be affected in the same way by the occurrence or non-occurrence of a specific event. A problem with this approach is that the individual investments in which the investor takes a position may be influenced by factors other than the occurrence or non-occurrence of the specified event. Further, each individual investment may be affected differently by the occurrence or non-occurrence of the specified event. Thus, the investor may not be able to fully isolate the economic impact that the occurrence or non-occurrence of a specified event may have, and directly invest in what he or she perceives to be the likely outcome of the event.

SUMMARY

In order to provide for investing based on the occurrence or non-occurrence of certain events, methods for creating and trading derivative contracts, as well as methods and systems for trading such contracts on an exchange, such as a parimutuel exchange, are disclosed. A digital options contract is an investment instrument in which investors can take risk positions based on the probable occurrence or non-occurrence of an event. In exchange for receiving a predetermined premium price from the long investor, a short investor in a digital option contract agrees to pay one of two specified settlement amounts to the long investor depending on the state of a binary variable at the expiration of the contract. If the binary variable does not occur, the short investor keeps the option price. However, if the binary variable does occur, the short investor pays the amount specified in the contract to the long investor. Typically the settlement amounts will be $0 and some other value greater than the digital option price. Thus, if the state of the binary variable is a first value, the short investor pays nothing to the long investor, and if the binary variable is a second value, the short investor pays the second amount less the option price.

One method of creating a financial instrument includes establishing a credit event identification scheme that includes a plurality of credit event categories, where an entity's credit event status is associated with at least one of the credit event categories. The method further includes establishing a digital derivative contract based on the entity and having a premium in which an investor will receive one of a first settlement amount when the entity is assigned a credit event status or a second settlement amount when the entity is not assigned the credit event status. The digital derivative contract is settled according to whether the credit event status is assigned to the entity or not assigned to the entity.

Another method of creating a financial instrument includes establishing a derivative contract based on an entity and having a premium. The premium is amortized as a periodic premium payment until either a predefined event or a redemption in the debt of the entity is confirmed, or until the expiration of the contract if no predefined event or a redemption is confirmed before expiration.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the appended claims.

DETAILED DESCRIPTION

Figure 1:
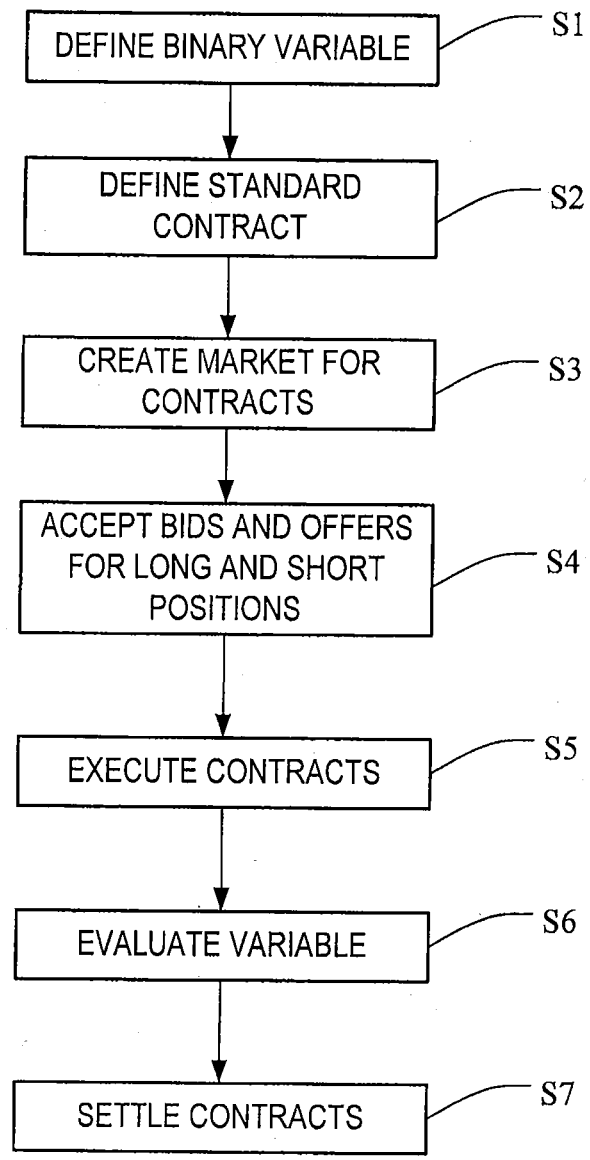
FIG. 1 is a flow chart showing a method of creating a digital derivative contract.

The present invention relates to a financial instruments, including those in which investors may take positions on the contingent state of a binary variable at a specified time in the future, and a system for trading such instruments. In one embodiment, the financial instrument may be considered a "digital" contract in that it will settle at one of two different settlement amounts in the future based on the state of a binary variable at expiration. As with traditional derivatives contracts, a digital derivatives contract according to the present disclosure is merely a set of mutual promises between two parties—a first investor who desires to take a long position with regard to the eventual state of a particular binary variable and a second investor who desires to take a short position with regard to the eventual state of the binary variable. The long investor agrees to pay a certain amount, the futures price, to the short investor in exchange for the short investor agreeing to pay to the long investor one of the two different settlement amounts depending on the state of the binary variable when the contract is settled. Typically one of the two possible settlement values will be $0 and the other settlement value will be a non-zero value greater than the futures price.

Digital derivatives contracts are "digital" in that they may be created around virtually any question that will have only two possible answers: yes or no; true or false; 1 or 0; on or off; or the like. In general, the digital futures contracts will be written around specific contingent events, events that may or may not occur. Typically, the occurrence or non-occurrence of the specified event will be related to economic or market factors which investors may anticipate. For example a digital derivatives contract can be based on a binary variable that depends on whether the share price of a particular stock closes above a specified threshold on the expiration date of the contract. Conversely, a binary variable may depend on whether the share price closes below a specified threshold. Similarly, a binary variable can be established to determine whether a particular index or market indicator closes above or below (or at) a predefined threshold. Similar variables can be developed around economic indicators and interest rates. Alternatively, binary variables can be established based on whether a particular regulatory body takes a particular action or not. Will the federal reserve open market committee raise interest rates at its next meeting? Will the EPA bring an enforcement action against a particular company? Or the like. Specific examples of standard digital derivatives contracts may include, for example, 30-year fixed mortgage rate digitals; Sweet Crude Oil digitals; CBOE Volatility Index (VIX) digitals; gold digitals. The potential list of digital derivatives contracts is essentially limitless.

Another "digital" quality of the digital derivatives contracts is the binary nature of the settlement amounts. Whereas traditional derivatives contracts have settlement amounts that directly reflect the value of the underlying asset in relation to the a price, digital derivatives have only two possible settlement amounts, each corresponding to one state of the binary variable. For example, if the state of the binary variable turns out to be "no", the second investor may be required to pay the first settlement amount to the first inventor. If the state of the binary variable turns out to be "yes" the second investor may be required to pay the second settlement amount to the first investor. In most cases one settlement amount will be zero and the other will be a substantial amount. Thus, the second investor will either pay the first investor nothing or a significant amount depending on the outcome of the binary variable. The first investor will be required to pay the derivatives price regardless. Thus, if the second investor is required to pay a non-zero amount, the derivatives price may be deducted from the settlement amount when the contract is settled.

Alternatively, a digital derivatives contract may be structured so that both the first investor and the second inventor deposit their maximum possible loss under the digital derivatives contract when the digital derivatives contract is formed. Then, as the binary variable turns out to be "no" or "yes," the deposited amounts from the first or second investor shifts to the account of the investor holding the position corresponding to the result of the binary variable. For example, when a digital derivatives contract having a settlement value of $1,000 is formed, a first investor taking the long position deposits $400 and a second investor taking the short position deposits $600. At settlement after the binary variable turns out to be "no" or "yes," one investor will have an account balance of $1,000 and the other investor will have an account balance of $0.

A hypothetical digital derivatives contract could be created around the binary question "Will the Dow Jones Industrial average close above 11,000 at the end of the second quarter of the present year?" Clearly, the answer to this question will be known on July 1, and it will be either yes or no. The investors entering into such a digital contract may agree on settlement amounts of $0 if the Dow closes at or below 11,000 and $100 if the Dow closes above 11,000. Further, the first investor may be willing to pay the second investor $70 for the right to receive either $0 or $100 depending on whether the Dow closes above 11,000 on July 1 or not. If on July 1 the Dow does not close above 11,000 the first investor pays the second investor $70 and the second investor owes the first investor nothing. Thus, the second investor, who took a short position in the contract, makes a $70 profit. The first investor, who took the long position, suffers a $70 loss. Contrarily, if the Dow does in fact close above $11,000 on July 1, the first investor is still obligated to pay the $70 futures price to the second investor, but now the second investor is obligated to pay the second settlement amount of $100. The $70 owed by the first investor may be deducted from the amount owed by the second investor. Thus, the second investor need actually pay only $30 to the first investor and the first investor need actually pay nothing. In this case the second investor suffers a $30 loss and the first investor sees a $30 gain. Thus in the present example, the first investor has placed $70 at risk with the opportunity to realize a $30 gain, whereas the second investor has placed $30 at risk with the opportunity to realize a $70 gain.

Of course in a real world scenario the amounts investors will be willing to risk on different positions will depend on how likely they perceive one result to be compared to the other. In the above example, for instance, if the stock market has been steadily rising and is approaching 11,000, investors may be less inclined to take the short position. This would tend to drive up the derivatives contract price in order to increase the possible return for the apparent increased risk that the Dow will in fact close above 11,000. Conversely, if the market has been stagnant and the Dow is nowhere near 11,000 it may be a good bet that it will not close above $11,000 by the end of the second quarter. Accordingly, investors may be less willing to take the long position thereby driving down the derivatives contract price.

FIG. 1 shows a flow chart of a method of creating and trading digital derivatives contracts according to the present invention. The first step S1 is to define a binary variable that may take on one of two different states at a time in the future (i.e. at expiration). The second step S2 is to define a standard digital derivatives contract. The standard contract will define the binary variable, establish both the first and second settlement amounts, and specify the expiration date of the contract. The price for the digital derivatives contracts based on the standard contract will be established in the open market. Step S3 is to create a market for the digital derivatives contracts. Step S4 is to accept bids, offers and purchase orders for both long and short positions in digital derivatives contracts which are to be created according to the standard digital derivatives contract. Step S5 is to execute digital derivatives contracts by matching corresponding orders for long and short positions. In step S6 the binary variable is evaluated at the expiration of the contract, and in step S7 the contract is settled.

Regarding step S6, it is also contemplated that the binary variable may also be evaluated at any time prior to expiration, so that other contract formats are possible. For example, if, at any time prior to expiration, the binary variable is in-the-money (or at-the-money), then a payout can be realized at expiration.

It is intended that digital derivatives contracts according to the present invention will be traded on an exchange. The exchange may be a traditional open outcry exchange, an electronic trading platform such as the Chicago Board Options Exchange Futures Exchange (CFE), or a combination of open outcry and electronic systems such as the Chicago Board Options Exchange (CBOE). Employing the method outlined in FIG. 1, the exchange may from time to time identify binary variables in which it believes investors will be interested in taking positions. For example, the exchange may determine that investors will be interested in taking positions relative to the movement of 30-year fixed mortgage rates relative to one or more threshold values, or the price of a commodity such as sweet crude oil prices or gold prices, again relative to one or more price thresholds. Alternatively, the exchange may determine that investors are interested in taking positions regarding the movements of a particular index such as the CBOE volatility index (VIX), relative to certain significant threshold values.

In cases where the binary variable relates to the price or value of an underlying asset, commodity or market indicator, the step of identifying the binary variable requires identifying the underlying asset commodity or market indicator as well as defining a threshold value. For example, a CBOE Sweet Crude Oil digital derivatives contract may be based on the price of a barrel of West Texas intermediate crude oil for delivery in Cushing, Okla. as published by the Department of Energy (DOE) on the last day of each month. Thresholds values may be established at even intervals, e.g., $48, $50, etc., with a first threshold being established at an even interval closest to the last price published by the DOE for West Texas crude. If desired, additional thresholds may be established above and below this value, and may serve as the basis for additional series of digital derivatives contracts. For example, if the DOE published a price of $47.50, a first threshold may be defined as $48 and three additional threshold values may be established above this value at $50, $52, and $54 and three below at, $42, $44, and $46. A binary variable may then be defined for each threshold value. In this case, the binary variable for each threshold may be defined by the question:

"Is the price of West Texas sweet crude published by the DOE at the end of a specified month greater than $42, $44, $46, $48, $50, $52, or $54?" Each of these binary variables may serve as the basis for a separate series of digital derivatives contracts.

Once the binary variable has been defined, the exchange defines a standard digital derivatives contract (step S2) based on the defined variable. The standard contract created by the exchange will define the terms of the actual individual contracts that investors will enter when placing orders to take positions in the digital derivatives contracts. All of the details of the instrument must be spelled out. The binary variable must be defined; the settlement amounts established; the length of the contract; the date, possibly even the time when the binary variable will be evaluated; when and where the contracts may be traded; pricing conventions; delivery; and so forth. Using the example of CBOE Sweet Crude digital derivatives, the underlying variable may be defined as described above with settlement amounts of, for example, $1000 or $0 depending on whether the DOE published month end price is at or above the specified threshold value or not. The trading platform may be, for example, the electronic trading platform CBOEdirect® which allows trading between the hours of 8:30 A.M.-3:15 P.M. Central Standard Time. Contract trading may be limited monthly contracts, i.e., digital derivatives contracts that settle at the end of each month. The standard contract may set pricing conventions such as the granularity of price increments. For example, the CBOE Sweet Crude Oil digital derivatives prices may be limited to multiples of $10, e.g., $400, $410, $420, and so forth, while the price of the underlying commodity, West Texas Sweet Crude, is stated to two decimal places, e.g., $48.25. A minimum tick size such as $10 may also be established. Further contingencies can be spelled out, such as what will the impact of the DOE revising its price after contracts have settled, or how contracts will be settled if the DOE fails to publish a price on the specified settlement date. Finally, delivery provisions may be spelled out. For example, the buyer may be required to deposit the entire derivatives price, and the seller the greater of the two settlement amounts less the derivatives price. The two accounts may then be marked-to-market on a daily basis based on changes in the derivatives price. However, the accounts may be set up such that investors may not withdraw their funds until the business day after the final settlement date to ensure that sufficient funds are available to cover the contract.

Step S3 from FIG. 1 may be accomplished by listing one or more defined contracts on an exchange or trading platform. Listing a contract includes disseminating information about the contract to potential investors and providing a mechanism whereby investors may make bids and offers and place orders for the contracts. The CBOE Sweet Crude or Digitals of the present example may be traded on the CBOEdirect electronic trading platform. CBOEdirect is a trading facility which disseminates information regarding contracts traded on the platform, and allows brokers and dealers to place orders for customers who enter bids and make offers to buy and sell positions in such contracts.

Figure 2:
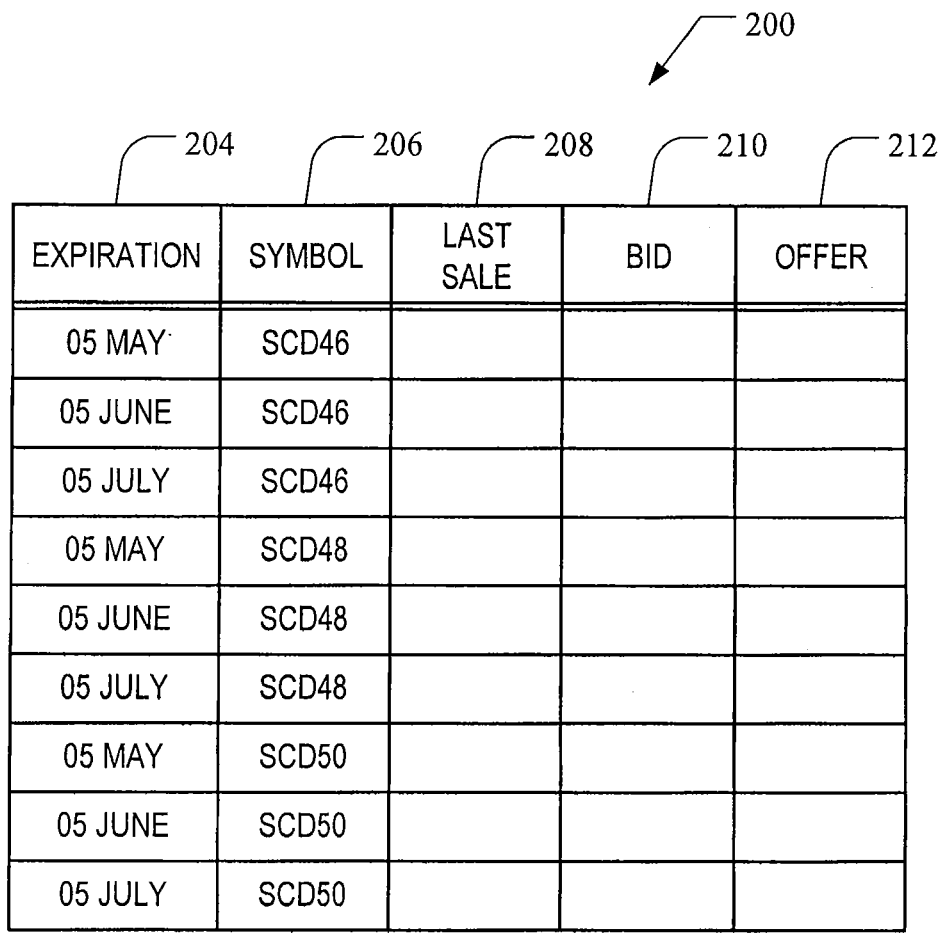
FIG. 2 is a sample listing of digital derivative contracts.

FIG. 2 is a sample listing 200 for CBOE Sweet Crude Oil Digitals. The listing 200 includes a plurality of different CBOE Sweet Crude Oil Digital derivatives contracts 202. Each contract includes a series expiration date 204, a trading symbol 206; a last sale price 208, a current bid 210, current offer 212. In the sample listing 200, the trading symbols SCD all refer to CBOE Sweet Crude Oil Digitals. The number following the symbol refers to the binary threshold for determining the settlement amount. The expiration 204 indicates the month at the end of which the contract will settle. The listing 200 includes three series of digital derivatives contracts based on a sweet crude oil price threshold of $46. One that settles at the end of May 2005, one that settles the end of June and one that settles the end of July. The listing 200 further includes Sweet Crude Oil Digital derivatives having May, June and July expirations and having price thresholds of $50.

Essentially, once a contract is defined and listed, the CBOEdirect electronic trading platform, in conjunction with other backend systems of the exchange, is responsible for all of the remaining steps of the method 100 shown in FIG. 1. CBOEdirect accepts bids and offers from investors or brokers (Step S4), and executes marketable orders by matching buyers to sellers (Step S5.) Other backend systems operated by the exchange evaluate the binary variables (Step S6) and settle the contracts at expiration (Step S7).

Figure 3:
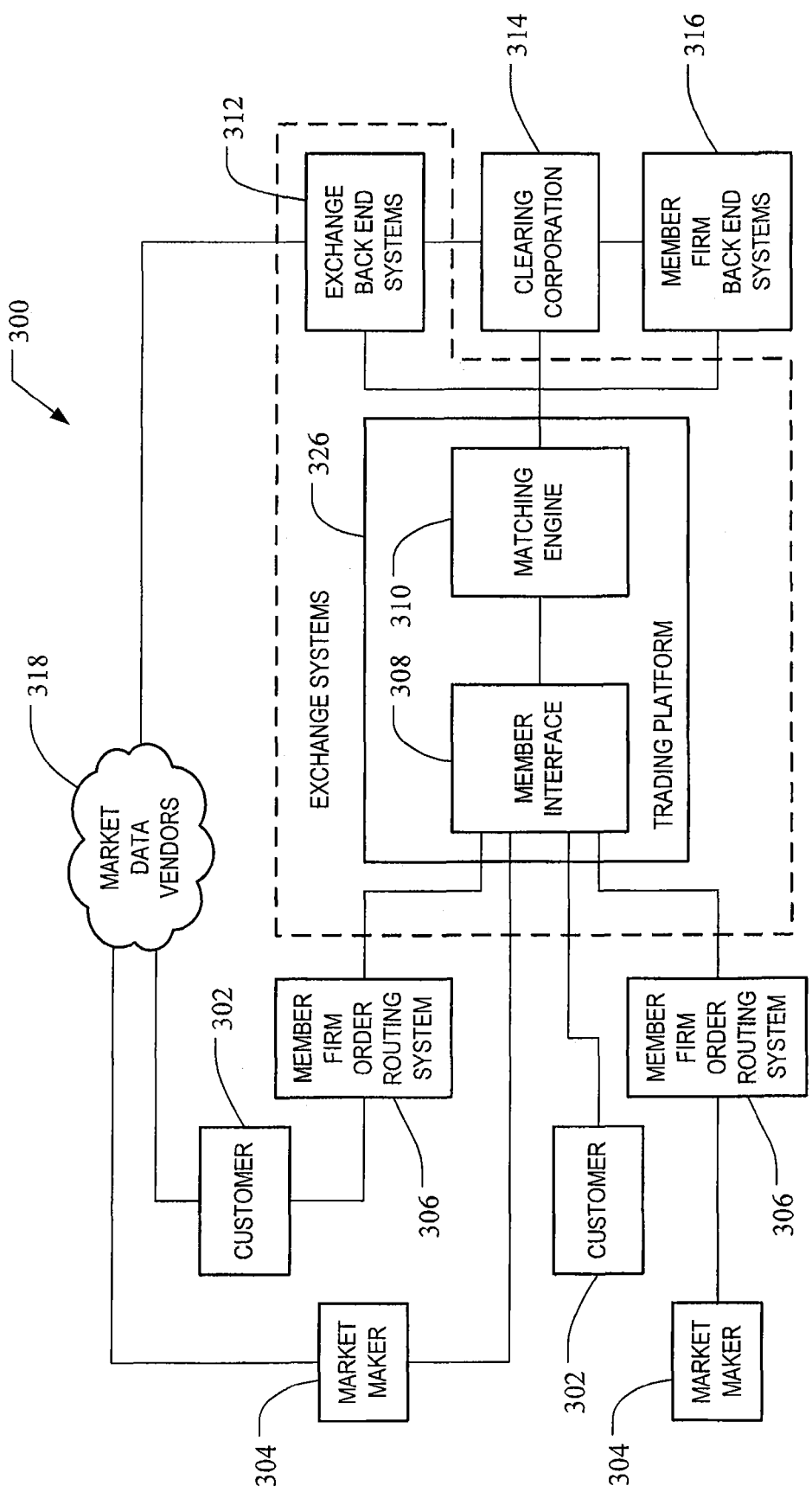
FIG. 3 is a block diagram of a system for trading digital derivative contracts.

FIG. 3 shows an electronic trading system 300 which may be used for listing and trading digital derivatives contracts. The system 300 includes components operated by an exchange, as well as components operated by others who access the exchange to execute trades. The components shown within the dashed lines are those operated by the exchange. Components outside the dashed lines are operated by others, but nonetheless are necessary for the operation of a functioning exchange. The exchange components of the trading system 300 include an electronic trading platform 320, a member interface 308, a matching engine 310, and backend systems 312. Backend systems which may not necessarily be operated by the exchange but which are typically involved in processing trades and settling contracts are the clearing systems 314, and member firms' backend systems 316. One suitable third party clearing system is the Options Clearing Corporation.

Market makers may access the trading platform 320 directly through personal input devices 304 which communicate with the member interface 308. Market makers may quote prices for digital derivatives contracts. Non-member customers 302, however, must access the exchange through a member firm. Customer orders are routed through member firm routing systems 306. The member firms' routing systems 306 forward the orders to the exchange via the member interface 308. The member interface 308 manages all communications between the member firm routing systems 306 and market makers' personal input devices 304; determines whether orders may be processed by the trading platform; and determines the appropriate matching engine for processing the orders. Although only a single matching engine 310 is shown in FIG. 3, the trading platform 320 may include multiple matching engines. Different exchange traded products may be allocated to different matching engines for efficient execution of trades. When the member interface 302 receives an order from a member firm routing system 306, the member interface 308 determines the proper matching engine 310 for processing the order and forwards the order to the appropriate matching engine. The matching engine 310 executes trades by pairing corresponding marketable buy/sell orders. Non-marketable orders are placed in an electronic order book.

Once orders are executed, the matching engine 310 sends details of the executed transactions to the exchange backend systems 312, to the clearing corporation systems 314, and to the member firms' backend systems 316. The matching engine also updates the order book to reflect changes in the market based on the executed transactions. Orders that previously were not marketable may become marketable due to changes in the market. If so, the matching engine 310 executes these orders as well.

The exchange backend systems 312 perform a number of different functions. For example, contract definition and listing data originate with the exchange backend systems 312. Pricing information for digital derivatives contracts is disseminated from the exchange backend systems to market data vendors 318. Customers 302, market makers 304, and others may access the market data regarding digital derivatives contracts via, for example, proprietary networks, on-line services, and the like. The exchange backend systems also evaluate the binary variable on which the digital derivatives contracts are based. At expiration, the backend systems 312 determine the appropriate settlement amounts and supply final settlement data to the clearing system 314. The clearing system acts as the exchange's bank and performs a final mark-to-market on member firm margin accounts based on the positions taken by the member firms' customers. The final mark-to-market reflects the final settlement amounts for the digital derivatives, and the clearing system 314 debits/credits member firms' accounts accordingly. These data are also forwarded to the member firms' systems 316 so that they may update their customer accounts as well.

Figure 4:
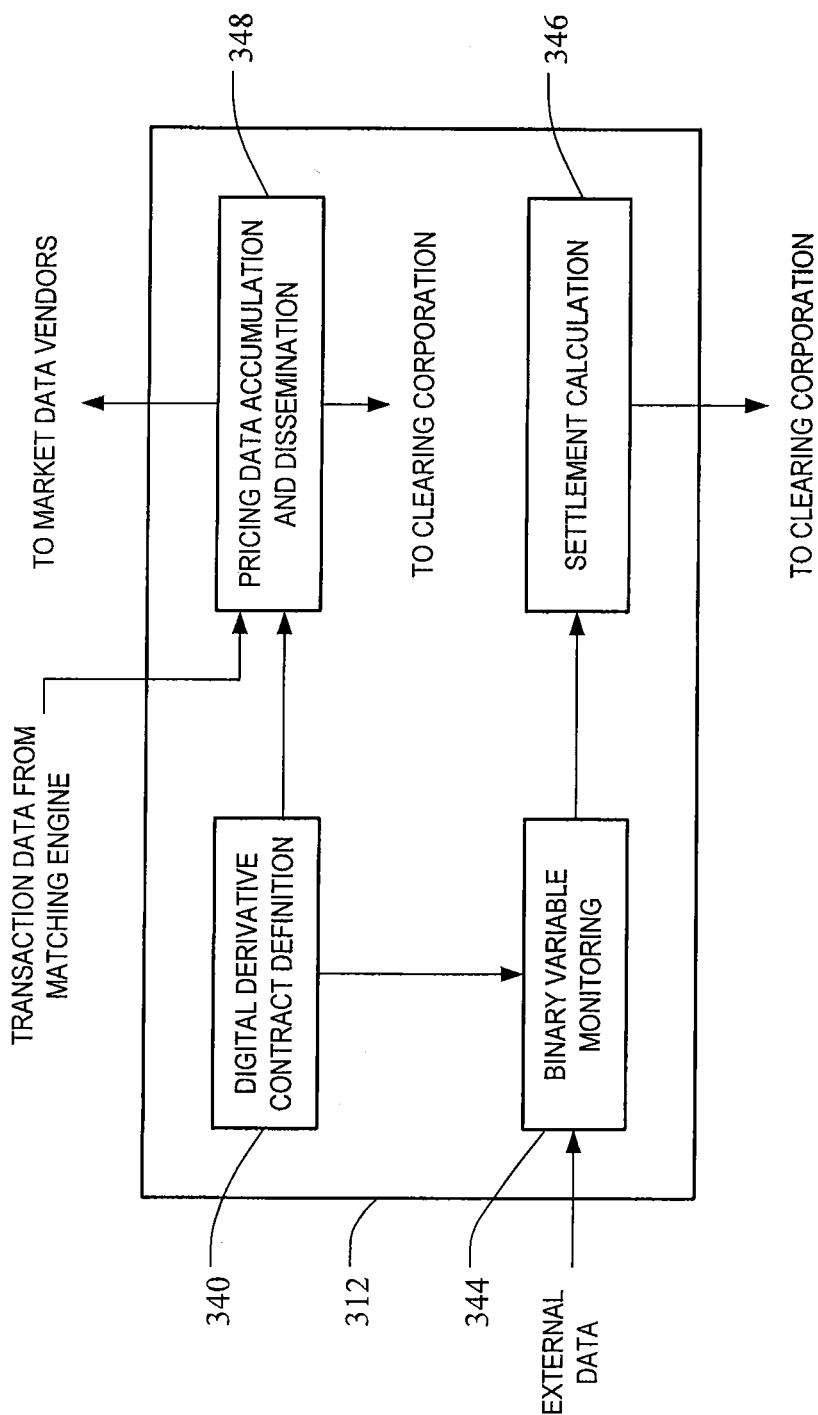
FIG. 4 is a block diagram of exchange backend systems for supporting the trading of digital futures contracts.

FIG. 4 shows the exchange backend systems 312 for trading digital derivatives in more detail. A digital derivatives contract definition module 340 stores all relevant data concerning the digital derivatives contract to be traded on the trading platform 320, including the contract symbol, the definition of the binary variable, the underlying asset (if there is one) the threshold value, or the event description, etc. A pricing data accumulation and dissemination module 348 receives contract information from the digital derivatives contract definition module 340 and transaction data from the matching engine 310. The pricing data accumulation and dissemination module 348 provides the market data regarding open bids and offers and recent transactions to the market data vendors 318. The pricing data accumulation and dissemination module 348 also forwards transaction data to the clearing system 314 so that the clearing system may mark-to-market the accounts of member firms at the close of each trading day, taking into account current market prices for the digital derivatives contracts. Finally, a settlement calculation module 346 receives input from the binary variable monitoring module 344. On the settlement date the settlement calculation module 346 calculates the settlement amount based on the state of the binary variable. The settlement calculation module 346 forwards the settlement amount to the clearing system which performs a final mark-to-market on the member firms' accounts to settle the digital derivatives contract.

The method of creating and trading digital derivatives contracts and the system for trading such contracts provides investors with a vehicle where they may isolate a single binary event and take a position relative to their estimate of whether the event will occur or will not occur. Thus, investors will be able to take positions relative to the events themselves rather taking indirect positions in the expected effects the occurrence or non-occurrence of the event will cause. The ability to take positions regarding such binary events allows investors to more accurately and efficiently manage risk.

A digital derivative contract may also be structured as a digital option contract and trade on an exchange as described above for digital derivatives contracts generally. Typically, a digital option contract is structured so that the option pays out a specified amount if the option expires in-the-money, or pays out nothing if the option expires out-of-the-money.

In one embodiment, the digital option contract is a digital put option contract based on an underlying asset or economic indicator with a strike price based on the current price of the underlying asset. At expiration of the digital put option contract, the option pays out a specified amount if the strike price is greater than or equal to the value of the underlying asset at expiration of the digital put option contract. However, if the strike price is less than the value of the underlying asset at expiration of the digital put option contract, the option pays out nothing.

In another embodiment, the digital option contract is a digital call option contract based on an underlying asset with a strike price based on the current price of the underlying asset. At expiration of the digital call option contract, the option pays out a specified amount if the strike price is less than or equal to the value of the underlying asset at expiration of the digital call option contract. However, if the strike price is greater than the value of the underlying asset at expiration of the digital call option contract, the option pays out nothing.

A hypothetical digital option contract could be created around the binary question "Will General Motors have a credit event, such as failing to pay on any of a specified set of its publicly traded debt or filing for bankruptcy, by the end of the second quarter of the present year?" Such is an example of a credit default contract that preferably settles in cash, based on the confirmation of the credit event in a "Reference Entity," in a basket of Reference Entities, or in any Reference Entity that is a component of a specified basket of Reference Entities. As used herein, basket refers to a collection or grouping. A Reference Entity includes, but is not limited to, a U.S. corporation or a sovereign entity (e.g. country) reporting to the SEC. Such a Reference Entity has a credit event if, between the listing date and the close of the last day of trading, (1) it fails to pay on any of a specified set of its publicly traded debt or (2) it files for bankruptcy. In an embodiment, the exchange confirms credit events documented by (a) bankruptcy filings, (b) SEC 8K filings (for U.S. corporations) or SEC 6K filings (for sovereign entities.), or (c) news releases from any two of the following: Bloomberg Service, Dow Jones News Wire, Wall Street Journal, New York Times or the like.

In another embodiment, contracts are based on a credit default rating service's, such as Standard & Poor's, default ratings for corporate, sovereign, and quasi-sovereign entities ("Entities"). The credit default rating service (Standard & Poor's) promptly assigns a rating of SD (selective default) or D (default) if an Entity fails to pay on one or more of its debt obligations. Preferably, either an SD or a D would qualify as a default. The conditions under which an Entity would be deemed to be in default closely match the conditions under which the credit default swap market would determine that this Entity has been affected by a credit event. In the U.S. market for credit default swaps, a credit event is deemed to occur if the Entity fails to pay on specified debt obligations or goes into bankruptcy.

The answer to the aforementioned example question relating to a credit event for General Motors will be known on July 1, and it will be either yes or no. The investors entering into such a digital contract may agree on settlement amounts of $0 if General Motors does not have a credit event and $100 if General Motors has such a credit event. Further, the first investor may be willing to pay the second investor a predetermined amount for the right to receive either $0 or $100 depending on whether the General Motors has a credit event by July 1 or not. If by July 1 General Motors does not have a credit event, the first investor pays the second investor the predetermined amount and the second investor owes the first investor nothing. Thus, the second investor, who took a short position in the contract, makes a profit corresponding to the predetermined amount. The first investor, who took the long position, suffers a loss corresponding to the predetermined amount.

Conversely, if General Motors does in fact have a credit event by July 1, the first investor is still obligated to pay the predetermined amount to the second investor, but now the second investor is obligated to pay the second settlement amount of $100. The predetermined amount owed by the first investor may be deducted from the amount owed by the second investor. Thus, the second investor need actually pay only the difference to the first investor and the first investor need actually pay nothing. In this case the second investor suffers a loss and the first investor sees a gain. Thus in the present example, the first investor has placed the predetermined amount at risk with the opportunity to realize a gain (offset by the predetermined amount), whereas the second investor takes on risk with the opportunity to realize a gain of the predetermined amount.

In another embodiment, a digital option contract could be created around the binary question "Will Company X's Initial Public Offering (IPO) have a stock price that is $50?"

As detailed by way of example below, a method of creating a financial instrument is described that includes establishing a derivative contract based on an entity and having a premium, and amortizing the premium as a periodic premium payment until either a predefined event or a redemption in the debt of the entity is confirmed, or until the expiration of the contract if no predefined event or a redemption is confirmed before expiration.

Accordingly, another embodiment of a digital options contract is a credit event options contract; a security contract based on the debt obligations of a corporation called a Reference Entity. The premium of this digital options contract may be amortized as a quarterly premium payment until either a Credit Event or Redemption Event in the debt of the Reference Entity is confirmed, or until the expiration of the contract if no Credit Event or Redemption Event is confirmed before expiration. The quarterly premium payment may be quoted in basis points as an annualized spread rate. For example, a quoted spread of 240 basis points (0.0240) applied to a contract with a $1 million notional size means that the quarterly premium payment is $6,000. Once a Credit Event is confirmed, the digital options contract is settled either in cash or by physical delivery of specified debt obligations of the Reference Entity. For purposes of this specification, a Redemption Event, is defined in accordance with the terms of any Relevant Obligation(s) (e.g., Company ABC 8.5% July 2013 bond) and includes the redemption or maturity of the Reference Obligation and of all other Relevant Obligations. (If the Reference Obligation is redeemed or matures but other Relevant Obligation(s) remains, a new Reference Obligation will be specified from among the remaining Relevant Obligation(s).) The Reference Obligation may include other debt security obligations of the Reference Entity (the set of these obligations and the Reference Obligation are referred as the "Relevant Obligations").

The exchange confirms a Credit Event if: (1) there is a market consensus that a Credit Event has impacted the debt of the Reference Entity, or (2) there is no market consensus, but the exchange confirms:
    Failure to pay on the debt obligations of the Reference Entity, or
    Bankruptcy of the Reference Entity To be confirmed, a Credit Event must occur between the first day of listing and a time on the scheduled last day of trading. In an embodiment, the exchange can confirm a Credit Event until the fourth business day after the scheduled last day of trading.

Following over-the-counter (OTC) market conventions, the contract may determine that there are Successor Reference Entities based on the amount of debt obligations that are guaranteed by successors due to acquisitions, mergers, spin-offs, etc.

Yet another embodiment of a digital options contract could be an index credit event options contract. Index Credit Event Options are security contracts based on the debt obligations of a set (N) of equally weighted corporations that are components of the index. The index components are called Index Reference Entities. The premium of an Index Credit Event option is amortized as a quarterly premium payment until a Credit Event or Redemption Event is confirmed in the debt of every Index Reference Entity. Otherwise, the quarterly premium payment is paid until the expiration of the contract. The quarterly premium payment is quoted in basis points as an annualized spread rate. For example, a quoted spread of 240 basis points (0.0240) applied to a contract with a $1 million notional size means that the quarterly premium payment is $6,000. If a Credit Event is confirmed in one of the Index Reference Entities, the Credit Event is settled either in cash or by physical delivery of specified bonds of the index component, the component is removed from the index, and the notional to which the spread rate applies is decreased by 1/N.

As above, the exchange confirms a Credit Event in an Index Reference Entity if: (1) there is a market consensus that a Credit Event has impacted the debt of the Index component, or (2) there is no market consensus, but the exchange confirms:
    Failure to pay on the debt obligations of the Index component, or
    Bankruptcy of the Index Component To be confirmed, a Credit Event must occur between the first day of listing and a time on the scheduled last day of trading. In an embodiment, the exchange can confirm a Credit Event until the fourth business day after the scheduled last day of trading.

Although described above in the context of digital options contracts, it should not be construed that the method of creating a financial instrument including amortizing the premium as a periodic premium payment until either a predefined event or a redemption in the debt of the entity is confirmed, or until the expiration of the contract if no predefined event or a redemption is confirmed before expiration be limited to digital derivatives contracts. In fact, it is contemplated that such a method be applied to traditional derivatives contracts as well.

Such credit default contracts as described above may also be traded on an electronic parimutuel, or Dutch, auction system. Such an auction market would conduct periodic Dutch auctions, with market participants placing orders for digital option contracts that pay off a fixed dollar amount if an Entity is in default by settlement time and pay nothing otherwise. Multiple orders for multiple Entities in the auction pool may also be placed. All contracts that settle in-the-money are funded by the premiums collected for those that settle out-of-the-money. Thus, if General Motors were the only Entity in the pool to default, all participants who insured against a General Motors default would share the total premiums paid for the pool of Entities in the auction.

As mentioned, in a parimutuel auction, all the contracts that settle in-the-money are funded by those that settle out-of-the-money. Thus, the net exposure of the system therefore is zero once the auction process is completed, which means there is no accumulation of open interest over time. Additionally, the pricing of contracts depends on relative demand; the more popular the strike, the greater its value. In other words, a parimutuel action does not depend on market makers to set a price; instead the price is continuously adjusted to reflect the stream of orders coming into the auction. Preferably, as each order enters the system, it affects not only the price of the sought-after strike, but also all the other strikes available in that auction. In such a scenario, as the price rises for the more sought-after strikes, the system adjusts the prices downward for the less popular strikes. Further, the process does not require the matching of specific buy orders against specific sell orders, as in many traditional markets. Instead all buy and sell orders enter a single pool of liquidity, and each order can provide liquidity for other orders at different strike prices and the liquidity is maintained such that system exposure remains zero. This format maximizes liquidity, a key feature when there is no tradable underlying instrument.

It is preferred that financial instruments for such a parimutuel auction be designed to pay a payout value, say one dollar, to the trader or investor if a particular outcome among a set of potential outcomes occurs. Potential outcomes are preferably those that fall within "states," which are typically constructed from a distribution of potential outcomes (e.g., the default status of General Motors) owing to some real-world event. In such financial instruments, it is preferred that a set of states is chosen so that the states are mutually exclusive and the set collectively covers or exhausts all potential outcomes for the event. Thus, one state always occurs based on the outcome.

In another embodiment, contracts are related to, and in some cases based on terms of, credit default swaps ("CDSs"). A CDS is an over-the-counter ("OTC") swap that provides for payments to be made by one party to the other upon the occurrence of a credit event with respect to a reference entity.

In effect, a CDS transfers the credit exposure to the reference entity from one party (the "Protection Buyer") to the other party (the "Protection Seller"). A Protection Buyer makes periodic (quarterly, semi-annual or annual) fixed rate payments in an amount based on a quoted spread referred to as a "credit spread" or a "CDS spread." The CDS spread represents the yield required by an investor to compensate it for the credit risk associated with the potential default of the issuer. A CDS spread is quoted in basis points and represents the amortized value of the expected payment to the Protection Seller per dollar of notional value of CDS contract if a credit event occurs prior to the expiration of the CDS.

For example, on Jun. 5, 2006, it was reported on Bloomberg that the closing value (which refers to the end-of-day value) for the five-year Ford senior debt security CDS was 870.25 basis points. Based on an assumed quarterly payment schedule, the Protection Buyer would pay $21,756.25 per $1 million face value ($21,756.25=$1,000,000*0.087025/4) of Ford senior unsubordinated debt securities every three months to the Protection Seller. In return, the Protection Seller is required, upon the occurrence of a credit event with respect to the reference entity, to pay to the Protection Buyer either an agreed upon fixed amount or an amount determined by reference to the value of an identified security (referred to as the "reference obligation") of the reference entity. In some cases the Protection Seller makes this payment in exchange for delivery of the Reference Obligation or some equivalent security by the Protection Buyer.

Thus, credit spread options ("CSOs") are cash-settled option contracts that are based on and settle against an average of CDS spread mid-quotes of market participants at the close of the last day of trading. Each CSO generally specifies (a) the reference entity of the underlying CDS, (b) the specific debt security that serves as its reference obligation, (c) the definition of the credit event, and (d) the maturity of the CDS at the expiration of the option.

CSOs preferably have strike prices, and option prices, which are quoted in basis points. Each CSO preferably also has a contract multiplier, similar to index options. CSOs are preferably listed in near-term months followed by additional months in a quarterly cycle. If no bankruptcy is declared, or other credit event occurs prior to expiration, the options will expire on their scheduled expiration dates. If a bankruptcy is declared prior to the scheduled expiration, the options will cease to trade after the bankruptcy is confirmed. Alternatively, CSOs may also be structured as digital contracts and trade on an exchange as described above for a digital futures or options contracts.

The following is illustrative of an example of how CSOs could trade: suppose that on Aug. 19, 2005, an investor wanted to buy an at-the-money CSO call expiring on Sep. 20, 2005. On Aug. 19, 2005, the closing spread (or end-of-day spread) of a five-year CDS on Delphi was 800.35 basis points. Also suppose that on Aug. 19, 2005, the listed strike closest to 800.35 was 800. On Sep. 20, 2005, the spread of the Delphi CDS closed at 1825.823 and the 800 strike call option would have settled against that closing spread.

Figure 5:
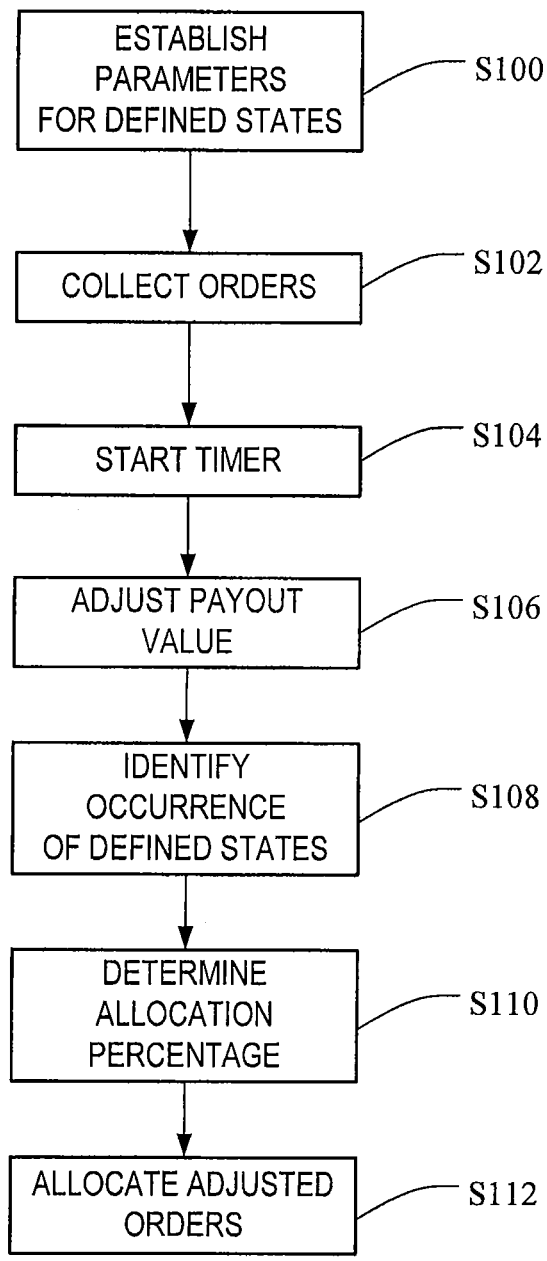
FIG. 5 is a flow chart showing a method of conducting an automated auction.

In an embodiment illustrated in FIG. 5, a method for conducting a parimutuel automated auction is shown generally including a step S100 for establishing parameters for at least one defined state corresponding to at least one potential outcome for a selected financial instrument. Another step (S102) is for collecting, prior to an occurrence of the at least one potential state, orders comprising at least one defined state, a size and a payout value associated therewith for the selected financial instrument and storing the orders in an electronic database. A timer for timing the auction is started at step S104. The payout value of the selected financial instrument corresponding to the size of orders entered by at least one market participant for the selected financial instrument is adjusted before an expiration of the timer at step S106. The duration of the timer may be set as desired, for example in terms of seconds, minutes or days. The occurrence of the at least one defined state is identified before the expiration of the timer at step S108. At step S110 an allocation percentage of the orders for allocating the selected financial instrument stored in the electronic database among market participants is determined by calculating a participation component and a pro rata component for each market participant. The orders having the adjusted payout value in the electronic database are allocated at step S112 by multiplying the determined allocation percentage for each respective market participant by an adjusted value component comprising a change in value between the payout value and the adjusted payout value of the entered orders. In accordance with the principles of a parimutuel auction, the adjusted payout value is zero for orders having the at least one defined state that did not occur before the expiration of the timer and the sum of all adjusted payout values for orders having at least one defined state that did occur is less than or equal to a total payout value for all orders.

Figure 6:
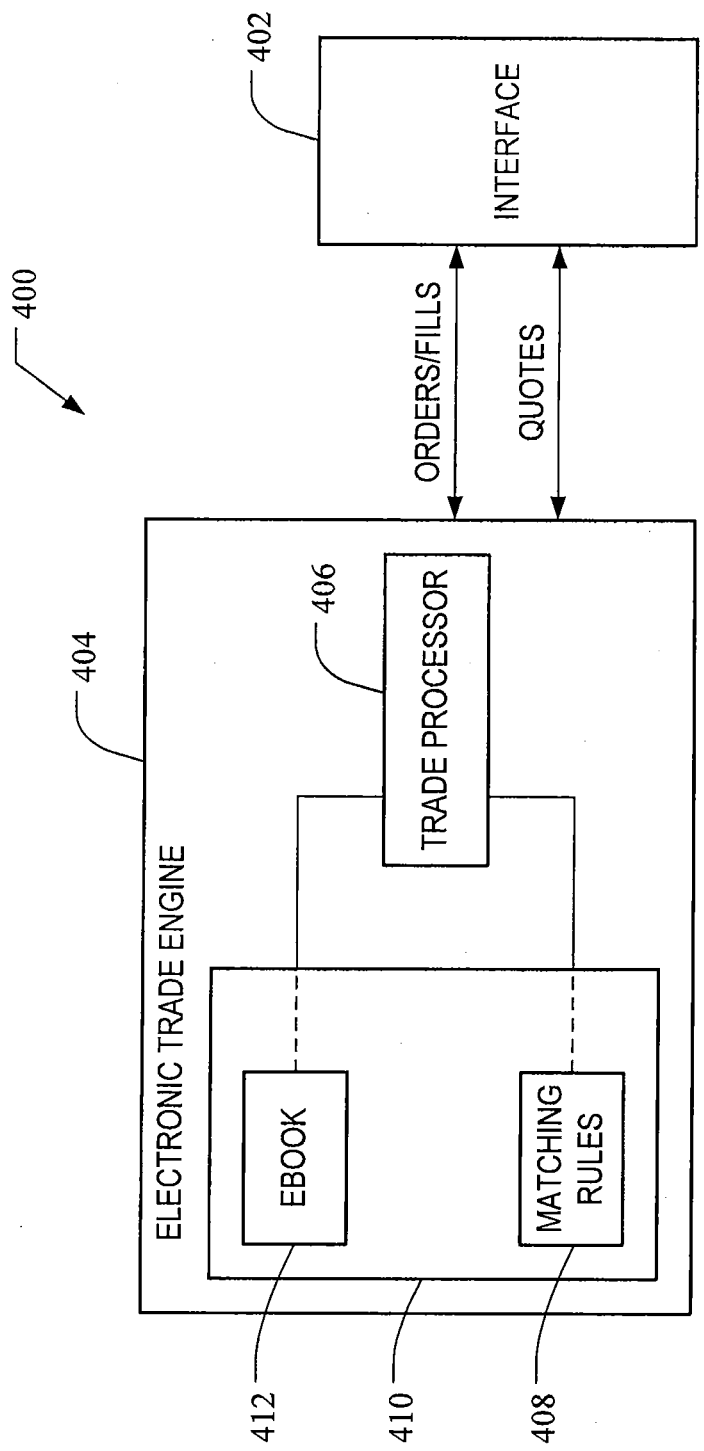
FIG. 6 is a block diagram of an automated exchange configured for auctioning of digital derivative contracts.

As illustrated in FIG. 6, an automated exchange 400 configured for parimutuel auctioning of a selected financial instrument by a combination of electronic and open-outcry trading mechanisms is shown. The automated exchange may be based on the exchange system disclosed in U.S. application Ser. No. 10/423,201, filed Apr. 24, 2003, entitled "HYBRID TRADING SYSTEM FOR CONCURRENTLY TRADING SECURITIES OR DERIVATIVES THROUGH BOTH ELECTRONIC AND OPEN-OUTCRY TRADING MECHANISMS," and this application is incorporated in its entirety by reference herein. The automated exchange 400 includes a data interface 402 for receiving an incoming order to purchase the selected financial instrument and routing the order to a electronic trade engine 404 that contains a processor means 406, such as trade processor, that analyzes and manipulates orders according to matching rules 408 stored in a system memory means 410, such as a database, in communication with the processor means 406. The data interface 402 performs various functions, including but not limited to, error checking, data compression, encryption and mediating the exchange of data between the exchange 400 and entities sending orders and/or quotes. Orders and quotations from the market participants are placed on the exchange 400 via the interface 402.

Also included in the electronic trade engine 404 is the electronic book memory means 412 (EBOOK) of orders and quotes with which incoming orders to buy or sell are matched with quotes and orders resting on the EBOOK 412 according to the matching rules 408. The electronic trade engine 404 may be a stand-alone or distributed computer system. Any of a number of hardware and software combinations configured to execute the trading methods described below may be used for the electronic trade engine 404. In one embodiment, the electronic trade engine 404 may be a server cluster consisting of servers available from Sun Microsystems, Inc., Fujitsu Ltd. or other known computer equipment manufacturers. The EBOOK 412 portion of the electronic trade engine 404 may be implemented with Oracle database software and may reside on one or more of the servers comprising the electronic trade engine 404. The rules database 408 may be C++ or java-based programming accessible by, or executable by, the processor means 406.

Preferably, the incoming order has a size and a payout value associated therewith and is stored in the book memory means 412. The book memory means 412 is also for storing previously received orders, which also have a size and a payout value associated therewith. The system memory means 410 is included for storing predefined condition parameters for at least one defined state corresponding to at least one potential outcome for the selected financial instrument (described above) and allocating parameters for allocating orders among market participants. A timer means (not shown) is preferably also utilized for timing the parimutuel auction, the auction including a beginning time and an expiration time. Additionally, a processor means 406 is included for allocating orders among the previously received orders in the book memory means 412 based on the condition and allocating parameters in the system memory means 410. It is preferred that the condition parameters include at least one parameter for identifying an occurrence of at least one defined state occurring before the expiration time. It is further desirable to have the allocating parameters include parameters for allocating preferentially against orders with larger size, time-priority, or parameters for calculating an allocation percentage based on a formula that allocates the order identified with the at least one market participant. Such a formula may be:

$$X\% = siz[mp]/(siz[mp] + siz[pro])$$

where siz[mp] is the size of the order identified with the at least one market participant, and size[pro] is the sum of the sizes of professional orders not identified with the at least one market participant.

Further, the processor means 406 may be used for calculating a zero payout value for orders having the at least one defined state that did not occur before the expiration of the timer and a greater than zero payout value for orders having at least one defined state that did occur, wherein the sum of all payout values for orders having at least one defined state that did occur is less than or equal to a total payout value for all orders.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer implemented method of creating a financial instrument with a processor of an exchange, the method comprising:
    establishing a plurality of credit event categories with a digital derivative contract definition module in an exchange backend system;
    establishing, with a binary variable monitoring module, a digital derivative contract with a payout amount that is based on an index of a plurality of entities, wherein the digital derivative contract provides the payout amount based on:
        a first settlement plan when each one of the plurality of entities in the index is associated with a credit event in the plurality of credit event categories;
        a second settlement plan when none of the plurality of entities in the index is associated with a credit event in the plurality of credit event categories; and
        a third settlement plan when at least one, but not all, of the plurality of entities in the index is associated with a credit event in the plurality of credit event categories.

2. The method according to claim 1 wherein the plurality of credit event categories includes bankruptcy.

3. The method according to claim 1 wherein the plurality of credit event categories includes a non-payment of a debt.

4. The method according to claim 1 wherein at least one of the plurality of entities in the index is a corporation.

5. The method according to claim 1 wherein at least one of the plurality of entities in the index is a sovereign entity.

6. The method according to claim 1 wherein the payout amount is amortized as a periodic payment until either a credit event or redemption event in a debt of at least one of the plurality of entities in the index is confirmed, or until an expiration of the digital derivative contract if no credit event or redemption is confirmed before expiration.

7. The method of claim 1 further comprising:
    amortizing the payout amount as a periodic payment until either a predefined event or a redemption in a debt of at least one of the plurality of entities in the index is confirmed, or until the expiration of the digital derivative contract if no predefined event or a redemption is confirmed before expiration.

8. The method according to claim 7 wherein at least one of the plurality of entities in the index is a corporation.

9. The method according to claim 7 wherein at least one of the plurality of entities in the index is an index.

10. The method according to claim 6 wherein when the credit event is confirmed for at least one of the plurality of entities in the index, the processor removes the at least one of the plurality of entities associated with the confirmed credit event from the index.

11. The method according to claim 1 wherein the payout amount is an amortized payment.

12. The method according to claim 11 wherein the first settlement plan stops the amortized payment.

13. The method according to claim 11 wherein the second settlement plan continues the amortized payment until an expiration time associated with the digital derivative contract.

14. The method according to claim 11 wherein the third settlement plan reduces the amortized payment in accordance with the number of the plurality of entities in the index is associated with a credit event in the plurality of credit event categories.

15. The method according to claim 1 further comprising calculating a settlement amount for the digital derivative contract with a settlement calculation module in the exchange backend system according to whether a credit event is associated with one of the plurality of entities in the index or none of the plurality of entities in the index.

* * * * *